United States Patent
Porsche et al.

[15] 3,635,487
[45] Jan. 18, 1972

[54] STEERING MECHANISM FOR A ONE-TRACK SLIDE VEHICLE

[72] Inventors: Ferdinand Alexander Porsche, Doffingen Kreis Boblingen; Theodor Bauer, Leinfelden, both of Germany

[73] Assignee: Firma Dr.-Ing. h.c. F. Porsche K.G., Stuttgart-Zuffenhausen, Germany

[22] Filed: July 15, 1969

[21] Appl. No.: 841,703

[30] Foreign Application Priority Data

Sept. 12, 1968 Germany..................P 17 80 412.5

[52] U.S. Cl..............................................280/16, 280/279
[51] Int. Cl............................................................B62b 13/04
[58] Field of Search..........................280/279, 16; 74/511.1; 287/117

[56] References Cited

UNITED STATES PATENTS

| | | | |
|---|---|---|---|
| 653,642 | 7/1900 | Darling | 280/279 |
| 717,684 | 1/1903 | Humphereys | 287/117 |
| 773,921 | 11/1904 | Campbell | 287/117 |
| 910,797 | 1/1909 | Donnelly et al | 287/117 |
| 1,588,128 | 6/1926 | Montgomery | 287/117 |
| 1,809,295 | 6/1931 | Gundersen | 280/16 |
| 3,260,535 | 7/1966 | Janlmes | 280/279 |
| 3,436,091 | 4/1969 | Brenter | 280/16 |

*Primary Examiner*—Benjamin Hersh
*Assistant Examiner*—Robert R. Song
*Attorney*—Craig, Antonelli & Hill

[57] ABSTRACT

A one-track slide vehicle with a supporting frame to which a rear runner and a steering mechanism with a front runner are attached. The steering mechanism includes a steering column and a handlebar which cooperate with each other by means of a detachable sleeve which has screw threads between the sleeve and the steering column and also between the sleeve and the handlebar, respectively. The screw threads between the sleeve and the steering column have a right-hand thread while the screw threads between the sleeve and the handlebar have a left-hand thread; the sleeve is scored on the outer surface so as to provide a good gripping surface for easy manipulation thereof.

15 Claims, 2 Drawing Figures

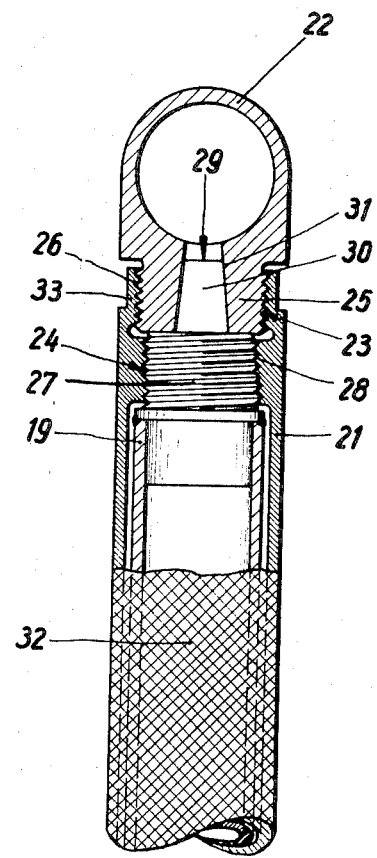

STEERING MECHANISM FOR A ONE-TRACK SLIDE VEHICLE

BACKGROUND OF THE INVENTION

The present invention relates to a slide vehicle, and more particularly, to a one-track slide vehicle with a supporting frame to which a rear runner and a steering mechanism provided with a forward or front runner are attached.

A one-track slide vehicle of the type having a tubular frame to which a steering mechanism provided with a front runner is hingedly attached is known. This steering mechanism comprises a steering column integrally connected with a steering means such as a handlebar. However, the disadvantage of this construction is that the steering mechanism cannot be detached from the tubular frame and, consequently, constitutes a bulky structural component during the transportation of the slide vehicle. In another type of slide vehicle of similar construction as set forth above, the above-mentioned disadvantage is only partially eliminated by providing that the handlebar can be separated from the steering mechanism. But here too, there is no possibility of detaching the entire steering mechanism from the frame.

SUMMARY OF THE INVENTION

Accordingly, it is the aim of the present invention to provide a steering mechanism for a slide vehicle of the aforementioned type so that it can be readily detached from, and/or attached to, the supporting frame. In this connection, the mounting of this steering mechanism should be possible without the necessity of complicated tools and with just a few manipulations.

The underlying problems are solved in accordance with the present invention by providing a steering mechanism which comprises a steering column and a handlebar as independent structural components, which are connected with each other in a detachable manner by means of a sleeve or tubular casing designed to serve as a connecting or coupling member. Thereby, the steering mechanism is constructed as a separable structural component which can be detached from the supporting frame and thus does not interfere when carrying the slide vehicle in cable cars, automotive vehicles, or the like.

The sleeve constructed as a connecting member cooperates with the handlebar and the steering column by means of threaded connections. This design affords a simple and, consequently, inexpensive coupling for these parts. The screw connections between the sleeve and the steering column and those between the sleeve and the handlebar, respectively, are preferably provided with opposed threads. The screw connection between the sleeve and the handlebar has a left-hand thread, whereas the screw connection between the sleeve and the steering column has a right-hand thread. Accordingly, it is possible to place the steering column as well as the handlebar of the steering mechanism into the installed position by rotating the sleeve in a clockwise direction, whereby a simple mounting of the steering mechanism is made possible.

The sleeve is also knurled or scored on its outer surface, thus ensuring a good grip on the sleeve. The sleeve is further provided with a nut-type section at its terminal or end zone facing the handlebar. Because of this, it is also possible to detach the sleeve by means of a fork wrench, which might be necessary after rough or improper treatment, corrosion effects, or the like.

The handlebar cooperates with the coupling column by means of a centering device. The installation of the steering mechanism and the alignment of the handlebar with respect to the steering column is simplified thereby. It is of further advantage to provide that the centering device consists of a pin attached to the steering column and a recess provided at the handlebar. The pin of the steering column and the recess of the handlebar have a polygonal cross section. This construction makes it possible to install the handlebar in the correct position with respect to the steering column. The pin of the steering column and the recess of the handlebar are provided with conically extending flanks or sides. Thus, the steering column and the handlebar of the installed steering mechanism are connected one inside the other in a braced fashion which, in turn, precludes an undesired release of the coupling.

BRIEF DESCRIPTION OF THE DRAWINGS

These and further objects, features and advantages of the present invention will become more obvious from the following description when taken in connection with the accompanying drawing which shows, for purposes of illustration only, an embodiment in accordance with the present invention, and wherein:

FIG. 2 shows a partial sectional view of a steering mechanism for use in a slide vehicle according to FIG. 1, but on an enlarged scale.

DETAILED DESCRIPTION OF THE DRAWINGS

Figure 1:
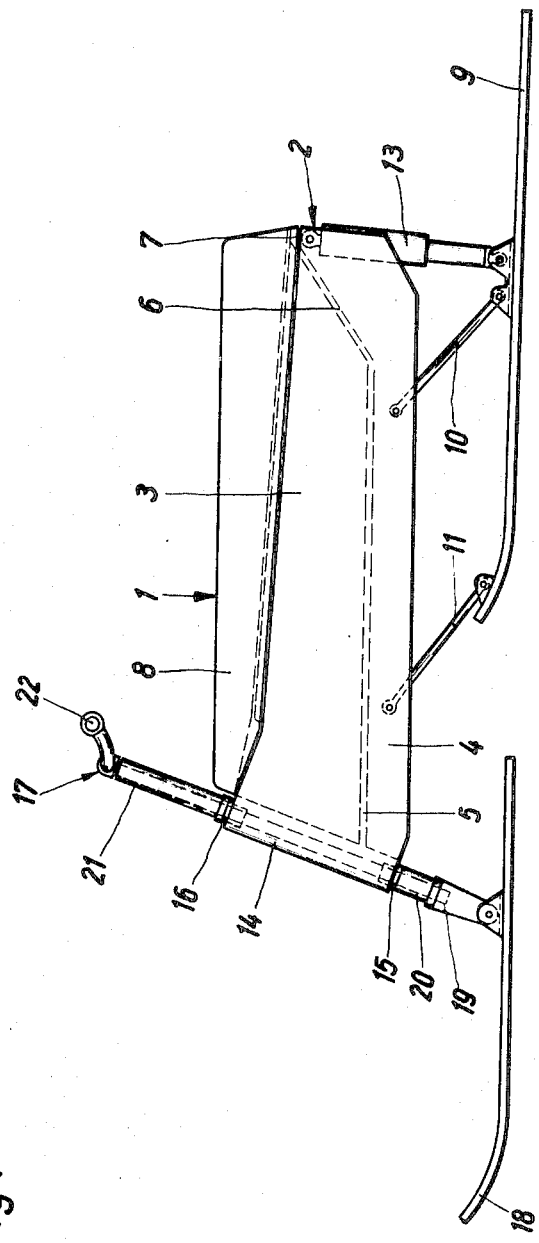
FIG. 1 shows a lateral view of a slide vehicle.

Referring now to the drawings and in particular to FIG. 1, a slide vehicle 1 is illustrated comprising a structurally rigid supporting frame or body 2. The supporting frame 2 is manufactured from a suitable synthetic material and is formed so as to be a hollow member. Cavities 3, 4 which are defined by partitions 5, 6, 7 are provided in the supporting frame 2. An upholstered seat is disposed in the upper region of the supporting frame 2 and extends over the entire length of the supporting frame 2. The seat 8 closes off the cavity 3 and is so constructed that it can be folded laterally by hinging the seat to one wall of the hollow supporting frame 2. A rear runner 9 is hingedly attached by means of guides 10, 11 on the side of the supporting frame 2 opposite the seat 8. The runner 9 is cushioned by a damping or shock-absorbing member 13 hingedly mounted to the supporting frame 2. The damping member 13 essentially consists of a shock absorber which is bilaterally effective. A supporting tube 14 is provided in the forward area of the supporting frame 2 and is provided on both of its ends with bearing bushings 15, 16 produced from a synthetic material or the like. The supporting tube 14 is integrally connected with the supporting frame 2 and serves for the mounting of the steering mechanism designated generally by numeral 17. The steering mechanism 17, as seen in FIG. 2, includes a steering column 19 provided with a forward runner 18. The steering column 19 is held in its position by an abutment part 20 and sleeve 21. The abutment part 20 and the sleeve 21 of the steering mechanism 17 rest on the bearing bushings 15, 16, respectively, of the supporting tube 14. Furthermore, the steering mechanism 17 has a handlebar 22 disposed at the free end of the sleeve 21.

As seen in FIG. 2, the sleeve 21 acts as a connecting member cooperating with the steering column 19 and the handlebar 22 through both screw connections 23, 24. The screw connection 23 is provided with a left-hand thread and is formed by a threaded pin 25 integrally connected with the handlebar 22, as well as by a threaded bore 26 associated with the sleeve 21. On the other hand, the threaded connection 24 is provided with a right-hand thread and is formed by a threaded pin 27 fixedly or firmly connected with the steering column 19, and by a threaded bore 28 provided in the sleeve 21.

The steering column 19 coacts with the handlebar 22 by means of a centering device designated generally by numeral 29. For this purpose, the threaded pin 27 of the steering column is provided with a receiving pin 30 extending into a recess 31 of the threaded pin 25 of the handlebar 22. The receiving pin 30 and the recess 31 have a polygonal cross section corresponding to one another in addition to being provided with conically extending flanks or sides.

When installing the steering mechanism 17 in the supporting frame 2, the sleeve 21 is rotated in the clockwise direction; by the cooperation of the screw connection 23, 24 provided with left-hand and right-hand threads, respectively, the steering column 19 and the handlebar 22 are thereafter moved into their appropriate mounted positions. The outer surface of the sleeve 21 is provided with scoring or knurling 22 so as to assure a good grip thereon and therefore to allow manipulation thereof. Furthermore, the sleeve is provided with a nut-type section 33 on the side facing the handlebar 22, so that it is also possible to release the connection by means of a simple tool such as a fork wrench.

While we have shown and described only one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as encompassed by the scope of the invention.

We claim:

1. A one-track slide vehicle comprising a supporting frame, a rear runner operatively attached to said supporting frame, a forward runner, a steering mechanism including a handlebar and a steering column, said steering column being operatively connected to said forward runner, said handlebar including first thread means, said steering column including second thread means, and attaching means including threaded sleeve means for threadably engaging both said first thread means and said second thread means to detachably connect said handlebar to said steering column and to detachably connect said handlebar and steering column to said supporting frame.

2. A one-track slide vehicle according to claim 1, wherein said first and second thread means have oppositely handed threaded portions and said sleeve means includes corresponding oppositely handed threaded portions.

3. A one-track vehicle according to claim 1, wherein said second thread means has a right-hand thread.

4. A one-track slide vehicle according to claim 3, wherein said first thread means has a left-hand thread.

5. A one-track slide vehicle according to claim 1, wherein centering means is provided for cooperation of said handlebar with said steering column.

6. A one-track slide vehicle according to claim 5, wherein said centering means includes a pin provided on said steering column and a recess provided at said handlebar.

7. A one-track vehicle comprising a supporting frame, a rear runner operatively attached to said supporting frame, a forward runner, a steering mechanism including a handlebar and a steering column, said steering column being operatively connected to said forward runner, sleeve means for detachably connecting said handlebar to said steering column, and centering means including a pin provided for said steering column and a recess provided at said handlebar, wherein said pin and said recess have a substantially polygonal cross section.

8. A one-track vehicle comprising a supporting frame, a rear runner operatively attached to said supporting frame, a forward runner, a steering mechanism including a handlebar and a steering column, said steering column being operatively connected to said forward runner, sleeve means for detachably connecting said handlebar to said steering column, and centering means including a pin provided for said steering column and a recess provided at said handlebar, wherein said pin and said recess are provided with conically extending sides.

9. A one-track slide vehicle according to claim 8, wherein said pin and said recess have a substantially polygonal cross section.

10. A one-track slide vehicle according to claim 9, wherein said sleeve means includes threaded connecting means for cooperating with said steering column and said handlebar.

11. A one-track slide vehicle according to claim 10, wherein said threaded connecting means includes screw connections between said sleeve means and said steering column and between said sleeve means and said handlebar, respectively, oppositely handed threaded portions.

12. A one-track slide vehicle according to claim 10, wherein said threaded connecting means between said sleeve means and said handlebar has a left-hand thread.

13. A one-track slide vehicle according to claim 12, wherein said threaded connecting means between said sleeve means and said steering column has a right-hand thread.

14. A one-track slide vehicle according to claim 13, wherein said sleeve means has scoring on the outer surface thereof.

15. A one-track slide vehicle according to claim 14, wherein said sleeve means is provided with a nutlike section at the end thereof facing said handlebar.

* * * * *